United States Patent [19]

Bleckmann

[11] 4,325,293

[45] Apr. 20, 1982

[54] APPARATUS FOR MAKING INFUSION DRINKS

[76] Inventor: Ingo Bleckmann, Ignaz-Rieder-Kai 11, 5020 Salzburg, Austria

[21] Appl. No.: 96,178

[22] Filed: Nov. 20, 1979

[30] Foreign Application Priority Data

Nov. 27, 1978 [DE] Fed. Rep. of Germany ....... 2851224
Jun. 29, 1979 [EP] European Pat. Off. ......... 79102191.8

[51] Int. Cl.³ .......................................... A47J 31/057
[52] U.S. Cl. ....................................... 99/300; 99/295; 219/309
[58] Field of Search ................ 99/281, 282, 283, 309, 99/300, 280, 279, 295, 302 R, 306, 307; 138/44, 45; 251/9; 219/297, 299, 307, 309

[56] References Cited

U.S. PATENT DOCUMENTS

| | | | |
|---|---|---|---|
| 3,503,409 | 3/1970 | Jones | 138/44 |
| 3,566,902 | 3/1971 | Muller | 138/45 |
| 3,750,710 | 8/1973 | Hayner | 138/44 |
| 3,895,646 | 7/1975 | Howat | 138/45 |

FOREIGN PATENT DOCUMENTS

2839295  3/1980  Fed. Rep. of Germany ........ 99/283

*Primary Examiner*—Robert W. Jenkins
*Attorney, Agent, or Firm*—Fleit & Jacobson

[57] ABSTRACT

Apparatus for making an infusion drink, comprises a water supply container and an electrically heated water through-flow conduit, and, therebetween, a regulator for regulating the through-flow of water, in the form of a choke or flow restrictor which acts to reduce the cross-section of the flow of water and to increase the flow speed, so as to provide for a through-flow rate, in each unit of time, which is substantially continuous over the entire period for which water is flowing through the apparatus, with the flow pressure in the choke or restrictor being higher than the steam pressure required for driving the water out of a riser pipe and into a beverage container.

22 Claims, 13 Drawing Figures

APPARATUS FOR MAKING INFUSION DRINKS

BACKGROUND OF THE INVENTION

A known apparatus for making coffee or other infusion beverages comprises a water supply container, an electrically heated water through-flow passage for carrying water from the supply container and thereby heating the water to produce steam which is passed through the coffee or the like for infusion thereof. A control means is disposed between the container and the passage for regulating the through-flow of water and for preventing steam from flowing back into the water supply container. In one form of this apparatus the control means for regulating the water through-flow and for preventing steam from flowing back into the water supply container comprises a valve with a movable valve member, generally a valve ball. This apparatus necessarily has a discontinuous mode of operation. Thus, when the water supply container has been filled, water flows through the valve by way of a feed conduit and into the electrically heated water through-flow passage and from there into a riser pipe. The outlet of the riser pipe, which is disposed for example above a coffee filter, is at a somewhat higher level than the maximum level of water in the water supply container, so that the flow into the riser pipe stops when the level of water in the riser pipe has reached the same level as the water in the supply container. The water is heated in this region, to a temperature which is close to boiling point, by the electrical heating means in the water through-flow passage, the outer layers of the column of liquid in the passage being converted into steam. Now, the increase in volume caused by the water being turned into steam results in a rise in the level of the column of liquid in the riser pipe and in the supply conduit connected to the supply container. The back-flow of water towards the supply container causes the ball valve to close so that a further increase in volume must necessarily take its effect in the riser pipe, so that first hot water and then water mixed with steam issues from the outlet opening of the riser pipe. If a large part of the column of water is discharged from the riser pipe and the water through-flow passage, the pressure in the passage collapses, as the steam can now escape substantially freely by way of the riser pipe. If the pressure in the passage drops below the pressure exerted by the standing column of liquid in the supply container, the ball valve opens and a fresh quantity of water can flow into the passage. The cold water flowing into the passage results in a cooling action and absorption of the steam so that the passage and the riser pipe are almost completely refilled with water. This procedure is then repeated, at approximately the same periods of time.

This mode of operation suffers from a number of serious disadvantages. Firstly, a not inconsiderable part of the water introduced into the water supply container is converted into steam which issues uselessly from the discharge opening of the riser pipe. If it is assumed that about one sixth of the water is converted into steam, the increased energy required is more than 30%, as the quantity of water must in fact first be heated to boiling point and then converted into steam. In addition, the steam issuing from the discharge opening of the riser pipe produces an unpleasant snorting noise. Furthermore, as the valve must necessarily include a movable member, the liability to breakdown of the apparatus is increased, whether this is due to jolts or being dropped or whether it is due for example to fouling as a result of incorrect use. Yet again, it is not possible to achieve the optimum water discharge temperature, by virtue of the discontinuous mode of operation. However, optimum discharge temperature of the water is of particular significance, more especially in the preparation of coffee. Furthermore, as apparatus of the above-indicated kind are generally mass-produced articles, the costs involved in producing the ball valve also play a not inconsiderable part.

SUMMARY OF THE INVENTION

An object of the invention is to provide a beverage-producing machine wherein the above-described disadvantages are eliminated. Another object of the invention is to provide such apparatus which is without a movable member in the water through-flow passage.

Yet another object of the invention is to achieve the optimum water outlet temperature.

To attain these and still other objects, the invention essentially provides that the means for regulating the through-flow of water and for preventing steam from flowing back into the water supply container is in the form of a restriction or choke or throttle means which allows a substantially continuous flow of water to pass therethrough.

The physical mechanism involved in the functioning of the apparatus of the invention has not yet been completely ascertained and explained, but it has generally been found that the transmission cross-sectional area of the choke or throttle means is fairly critical, as will be described in greater detail hereinafter. On the one hand, the restriction must be so narrow that the increased flow speed of the water in the region of the restriction is sufficient to prevent steam from getting back into the water supply container, and on the other hand, it is necessary to ensure that, according to the heating output of the heating means, the amount of water which is additionally allowed to flow through the water through-flow passage or conduit is that which is required for continuous through-flow with heating to a temperature of around 100° C. In apparatus of this kind, the best results were achieved with a water conduit diameter of 10 mm and a heating output of 650 watts, when the choke means or restriction aperture is 2 mm in diameter, that is to say, when the water through-flow cross-sectional area is reduced to 1 to 2% of the cross-sectional area of the water conduit. This provides a water-discharge temperature, at the beginning of the beverage boiling process, of 95° C. The maximum discharge temperature of 98° C. is reached after 2 to 3 minutes; in this respect, it should be noted that the tests which were carried out with the invention were effected at a level of about 700 meters above sea level, at which level therefore temperatures higher than 98° C. cannot be expected.

The choke means or restriction is arranged at the inlet side of the water passage, so that the choke means or restriction is in contact only with cold water, whereby the restriction does not suffer from calcification. The restriction or choke delays the supplementary or make-up flow of water from the water supply container, so that the rate of flow of water from the container approximately corresponds to the mean value of the outflow of water from the discharge opening of the riser pipe. This thus provides a longer residence time for the column of water in the heated water through-flow passage or, in other words, the choke or throttle provides that the amount of cold water which is added to the flow passage and to the riser pipe is at least approximately and preferably precisely that which can be heated to the optimum boiling temperature. Arranging the reduced through-flow opening at a central position, whether the restriction is of a circular form or whether it is in the form of a slot, a cross or other configuration, appears to produce an outstanding novel effect. The cold water is introduced into the centre of the previously heated body of water in the passage, in a uniform flow, that is to say, not at intervals of time as happened in previously known apparatus as discussed above. The formation of steam which causes the column of liquid to rise in the riser pipe begins at the periphery of the column of water, so that the outer annular layer of the column of water is first caused to rise up the riser pipe. This results in the core of cold water moving radially outwardly, being increasingly heated as it does so, as the column of water moves upwardly through the riser pipe.

DESCRIPTION OF THE PREFERRED EMBODIMENTS

Figure 1:
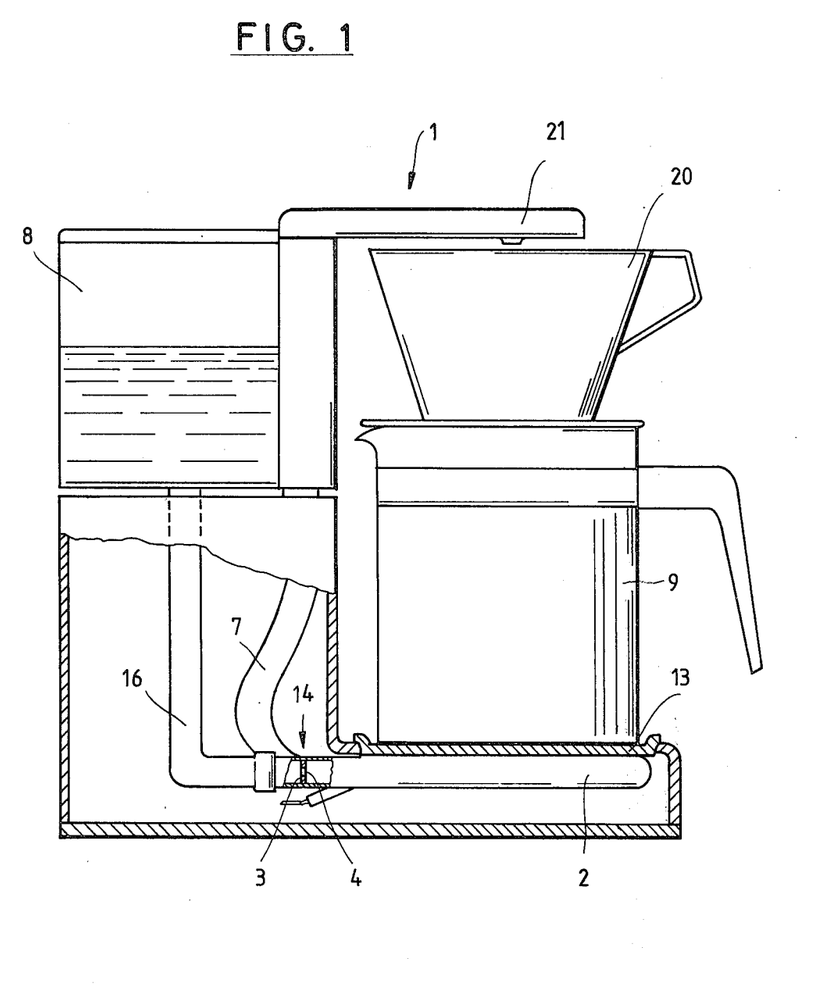
FIG. 1 shows a side view of apparatus in the form of a coffee-making machine.
Figure 2:
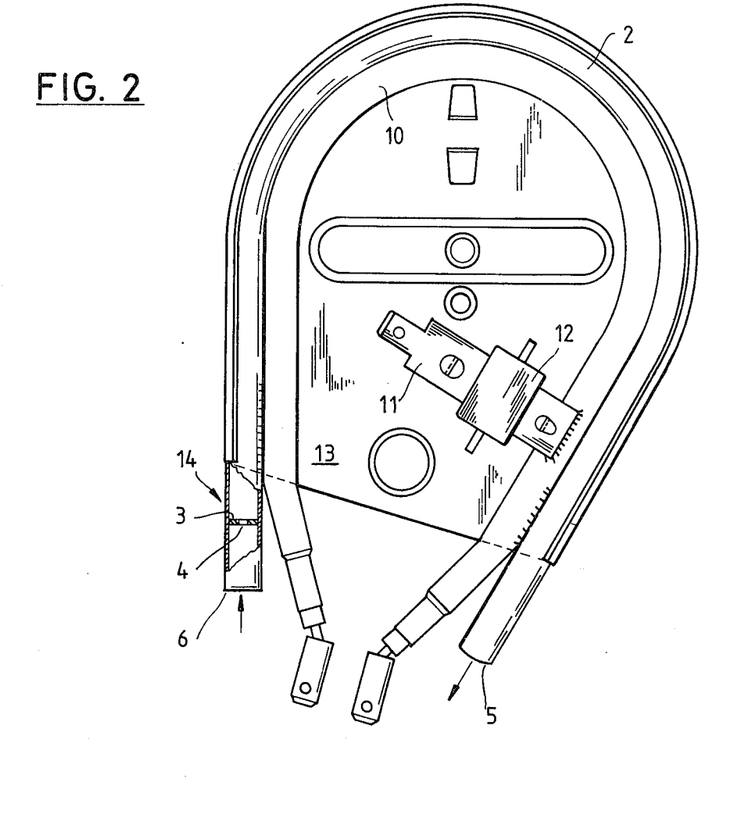
FIG. 2 shows a view from below of the FIG. 1 machine.
Figure 3:
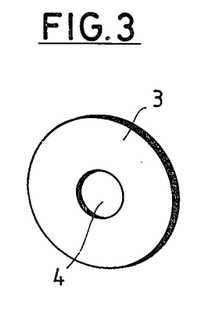
FIGS. 3, 4 and 5 show restriction members or chokes with different openings therein.
Figure 6:
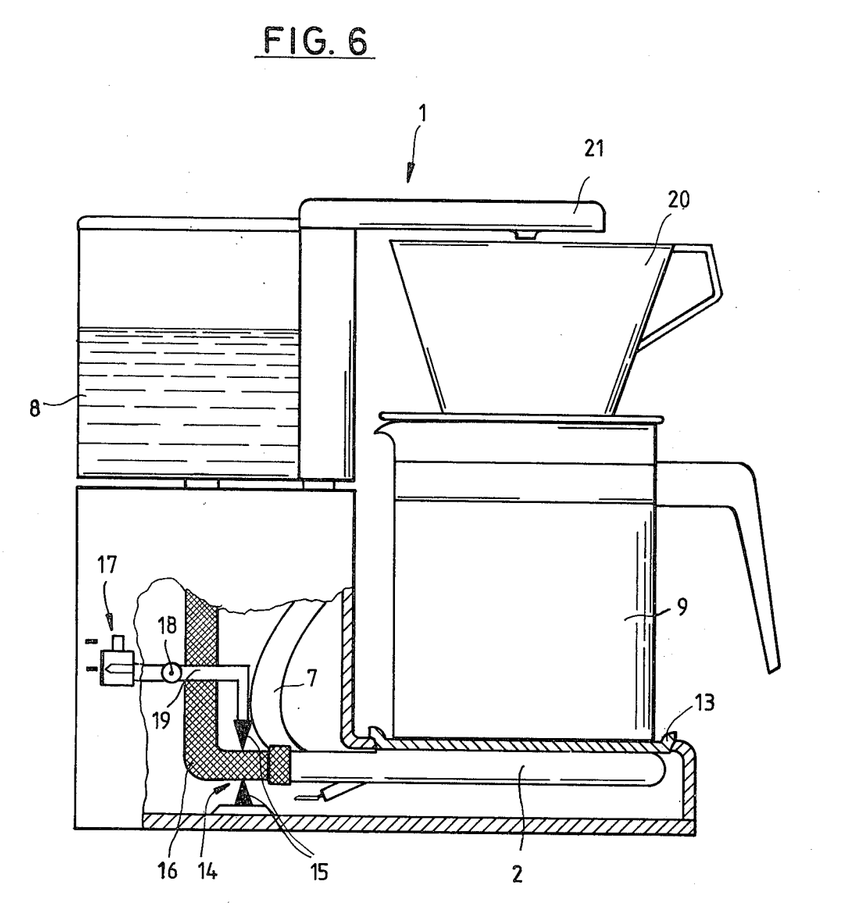
FIG. 6 shows a coffee-making machine incorporating an aroma or flavour selector.

Referring to the drawings and more particularly to FIGS. 1, 3 and 6, apparatus is shown in the form of a coffee-making machine comprising means for receiving a container 9 for receiving the finished infusion drink, for example coffee, the receiving means including a base plate 13 on which the container 9 can be set in position. On its underside, as can be seen from FIG. 2, the plate 13 is provided with a continuous-type or through-flow heater comprising an electrical tubular heating member 10 and a through-flow conduit or passage shown as a pipe 2. The tubular heater member 10 and the water through-flow pipe or conduit 2 are in heat-conducting relation with each other. Also disposed on the underside of the plate 13 is a bridge member 11 which is in heat-conducting relation with the pipe 2 and the tubular heater member 10 and which carries a thermostat 12. The thermostat 12 interrupts the supply of electrical current to the tubular heater member 10 as soon as the water in a supply container 8 (FIG. 1) is consumed, or the thermostat regulates the water holding temperature for the prepared infusion drink in the container 9.

The water supply container 8 is in communication with an inlet end 6 (see FIG. 2) of the pipe 2 by way of a supply conduit 16 (FIG. 1). The outlet end 5 (FIG. 2) of the pipe 2 is connected to a riser pipe 7 through which the heated water in the pipe 2 passes into an outlet 21 which is arranged for example over a coffee filter means 20.

In the construction shown in FIGS. 1 and 2, a member 3 with a central opening 4 is arranged at the inlet end 6 of the pipe 2, the member 3 with its central opening 4 acting as a restrictor choke or throttle means 14, for regulating the through-flow of water into the pipe 2. In the normal position of use of the apparatus, the pipe 2 extends horizontally and the restrictor opening of the member 3 is below the axial centre line of the pipe 2.

Figure 4:
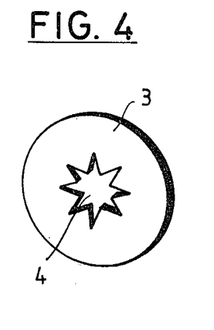
Figure 5:
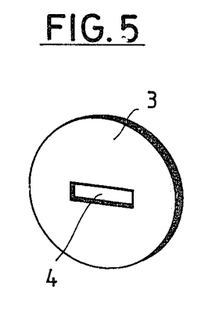

As shown in FIGS. 3, 4 and 5, the central opening 4 in the member 3 may be of a circular configuration (FIG. 3), a star-like configuration (FIG. 4) or of a slot-like configuration (FIG. 5).

The members 3 thus act to regulate the flow of water through the pipe or conduit 2, while also preventing heated fluid or steam from flowing back into the container 8. The member 3 thus reduces the cross-section of the flow of water therethrough and increases the through-flow speed, so that the current of water flowing through the conduit 2 in each unit of time is at least substantially constant over at least substantially the whole period of time for which fluid is flowing through the apparatus, with the flow pressure in the restrictor or choke means (member 3) being higher than the fluid or vapour pressure required to drive the steam or heated fluid out of the riser pipe. The restrictor means restricts the flow cross-section to from 2.0 to 14 mm$^2$, preferably from 2 to 7 mm$^2$.

In a test assembly used in the preparation of the graphs in FIGS. 7 through 10, the aperture member 3 was fitted on the inlet side of the pipe 2, and had a central circular bore 4 which was 2 mm in diameter. The check valve which is otherwise normally employed in this kind of apparatus in the prior art was omitted.

Measurements were taken on the one hand in respect of the discharge temperature of the heated water directly at the outlet 21 and on the other hand in respect of the water temperature in the container 9 which is provided to receive the prepared infusion beverage, the measurements being taken in dependence on different heating outputs in respect of the electrical heater member 10.

Figure 7:
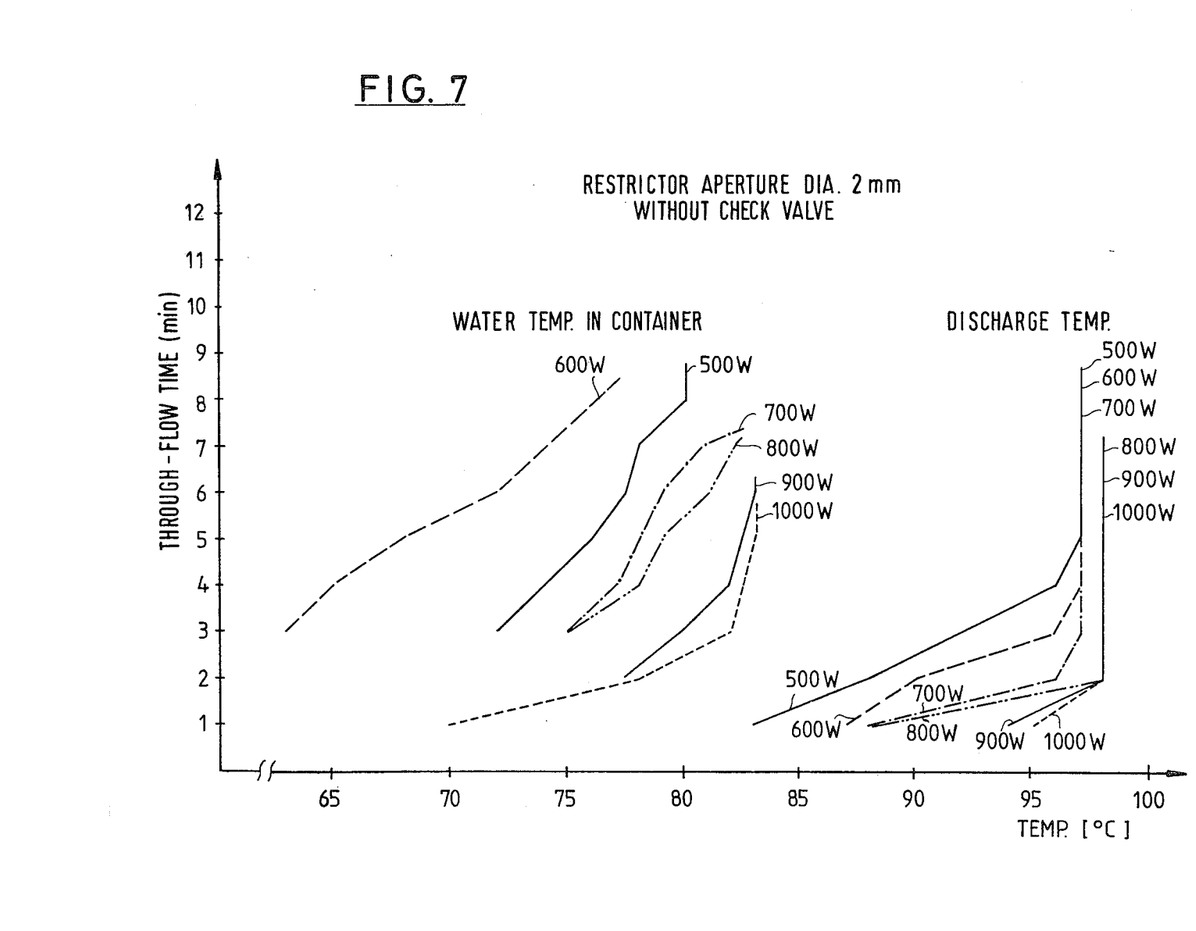
FIG. 7 shows a graph in respect of a machine according to the invention without a check valve, with a preferred restriction or choke diameter of 2 mm, for different heating output values.

FIG. 7 shows that, with heater outputs of 800, 900 and 1000 W, the ideal discharge temperature of 98° C. is reached (in this connection it should be noted that a higher temperature was theoretically not possible, at the air pressure conditions prevailing at the time: 700 meters above sea level). This ideal outlet temperature of 98° C. was achieved in every test situation, just two minutes after switching on the electrical heater member 10. The only differences are in the heating-up period and in the overall through-flow time: The overall amount of water which the apparatus could accommodate had already passed through the apparatus after 5.7 minutes, when the heating output was 1000 W, 6.3 minutes were required for the total amount of water to pass through the apparatus when the heating output was 900 W, while, when the heating output was 800 W, the time required was 7.3 minutes.

With heating outputs of between 500 and 700 W, the discharge temperature of the water was still relatively very high, in comparison with conventional coffee-making machines, that is to say, 96.5° C. This final temperature was reached after 3 minutes when the heating output was 700 W, after 4 minutes with a heating output of 600 W, and after 5 minutes with a heating output of 500 W. The period of time required for the total amount of water to pass through the apparatus was increased to 7.3 minutes with a heating output of 700 W, to 8.5 minutes with a heating output of 600 W and to 8.8 minutes with a heating output of 500 W.

The continuous uniform discharge of water at high temperature also caused correspondingly high water temperatures to be attained in the container 9 for receiving the infusion drink. If the same machine was operated in the original condition of the prior-art apparatus, that is to say, including a check valve and without the aperture or choke member 3, the water temperature attained after the second minute with a heating output of 1000 W is 73° C., in which connection reference should be made to the comparative diagram shown in FIG. 13. With the novel arrangement of the invention, the water temperature in the container 9 after the second minute was already 78° C., with a heating output of 1000 W. With the apparatus in the original, i.e. prior-art condition, the maximum temperature in the water container of 78° C. was reached after 4.5 minutes, with a heating output of 1000 W. In contrast, in the novel construction of the invention, the maximum water temperature after only the third minute was already 82° C. With all heating outputs of more than 600 W, temperatures achieved in the apparatus of the invention were 80° C. and above, whereas with the apparatus in its original condition, the temperatures did not exceed 78° C.

Figure 8:
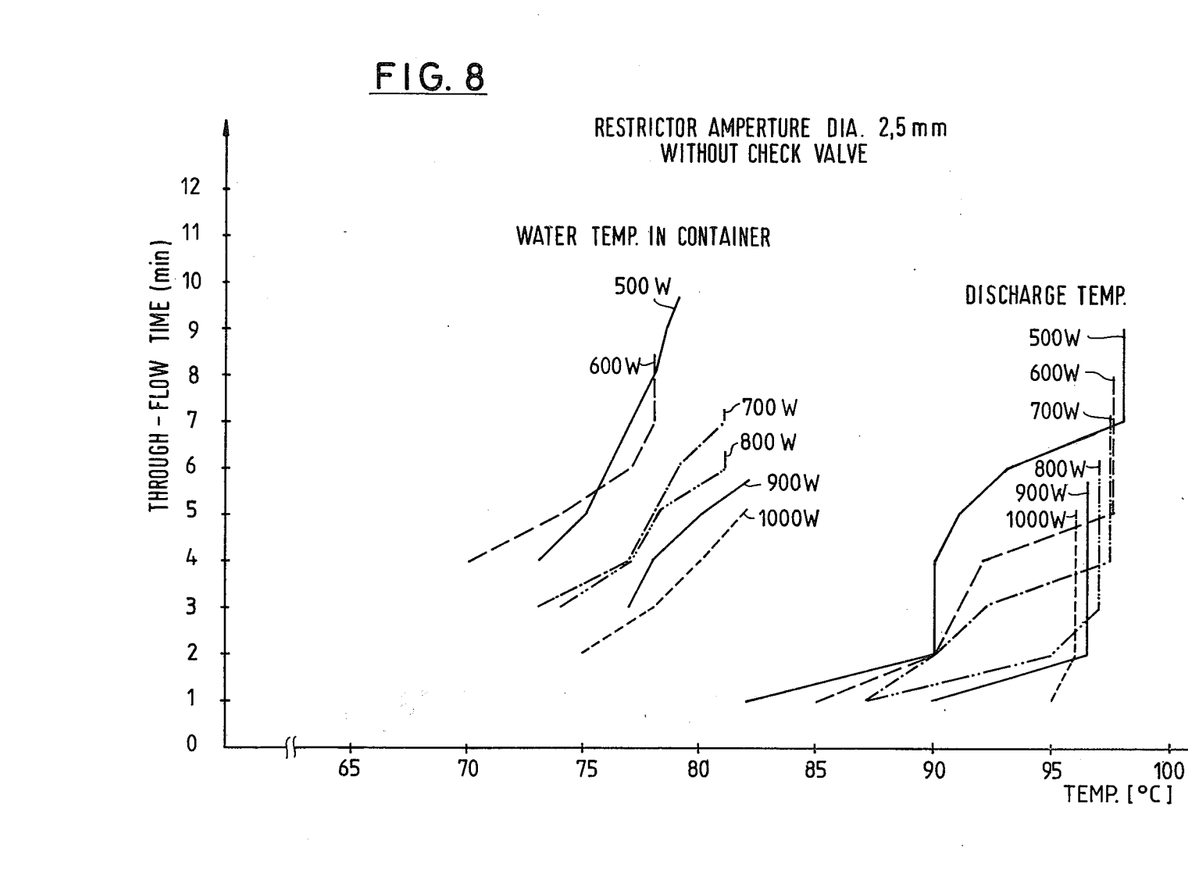
FIGS. 8 through 10 show graphs similar to FIG. 1 with restriction or choke diameters of 2.5 mm, 3.0 mm and 3.5 mm respectively.

FIG. 8 shows that the size of the aperture in the restrictor or choke member 3 is a very critical factor and has a substantial effect on the water discharge temperature. The testing arrangement used to produce the FIG. 8 graph was the same as that used in connection with FIG. 7, except however that the diameter of the central opening in the choke member 3 was 2.5 mm in the apparatus used to produce the graph of FIG. 8.

Surprisingly, the maximum water discharge temperatures were no longer reached with the high heating outputs of 800, 900 and 1000 W respectively, although it must be appreciated that the temperature values attained were still very much better than with the apparatus in the original condition, that is to say, without the choke or restrictor member 3 and with a check valve, in which connection reference should again be made to FIG. 13. The graph shows that, with the above-indicated diameter for the central opening in the member 3, heating outputs of between 700 and 800 W represent a good comprise between the discharge temperature which can be attained and the overall through-flow time required. However, a heating output of 500 W can offer advantages in connection with the preparation of coffee, insofar as the water discharge temperature rises more slowly in comparison with the values achieved at the higher heating outputs. As the solubility of caffeine, flavouring substances and bitter substances in coffee depends greatly on the one hand on the scalding temperature and on the other hand on the time required for the coffee to swell, a very good yield in respect of coffee production is obtained with a heater output of 500 W. However, it is necessary to accept a somewhat longer period of time for the water to flow through the apparatus in this case. The graph therefore shows that, by suitable selection of the diameter of the aperture in the choke or restrictor member 3, while being coordinated with respect to the heater output, it is possible to arrive at optimum characteristics depending on the particular purpose for which the apparatus is intended. If coffee-making machines which provide simultaneously for the making of two different infusion beverages are constructed in accordance with the invention, then different characteristics can be chosen for the two parts of the machine, for example one side or part of the machine can be designed for rapid through-flow with a high level of heat output, and the other side or part can be designed for a slower through-flow with a lower level of heat output. It will be appreciated that control of the heating output can also be taken into account.

Figure 9:
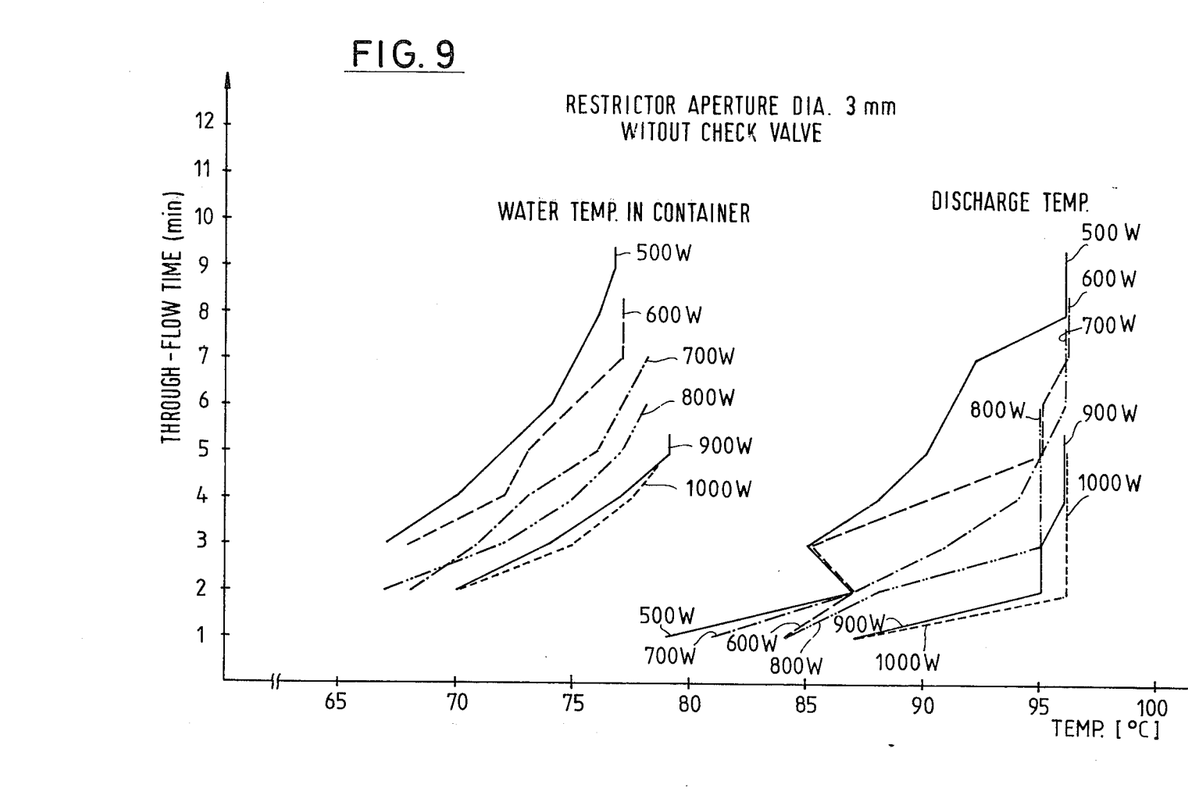

FIG. 9 shows a graph using the same apparatus, except that the diameter of the opening in the member 3 was 3.0 mm. Although this apparatus can still operate without a check valve, it will be seen that the machine lapses into a discontinuous mode between the second and third minutes, when heating outputs are 500 and 600 W, and the discharge temperature of the water drops in this period of time. This choke or restrictor diameter is accordingly suitable only for higher levels of heating output. However, at all levels of heating output, it is no longer possible to attain a maximum water discharge temperature of higher than 96° C.

Figure 10:
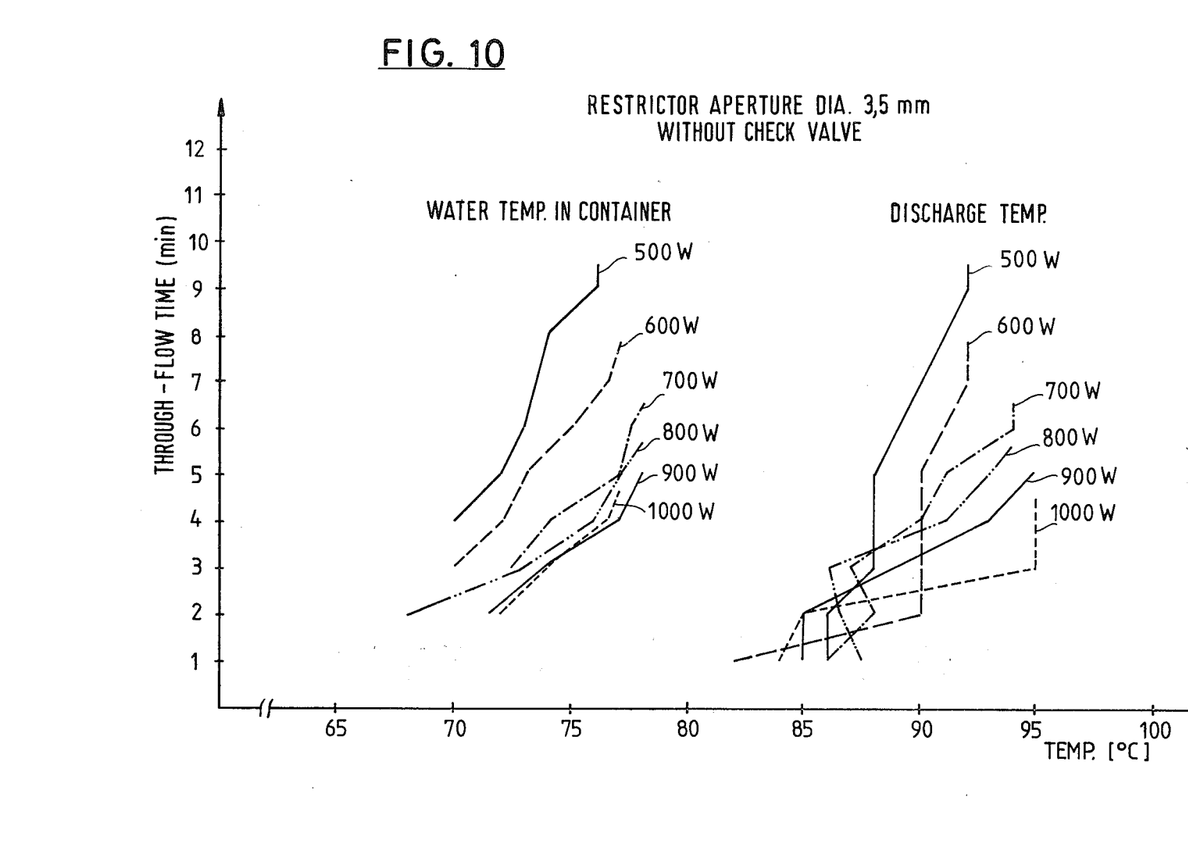

FIG. 10 shows that, when the diameter of the choke or restrictor aperture was 3.5 mm, a water discharge temperature of 95° C. was now reached only with heating outputs of 900 W and 1000 W.

Figure 11:
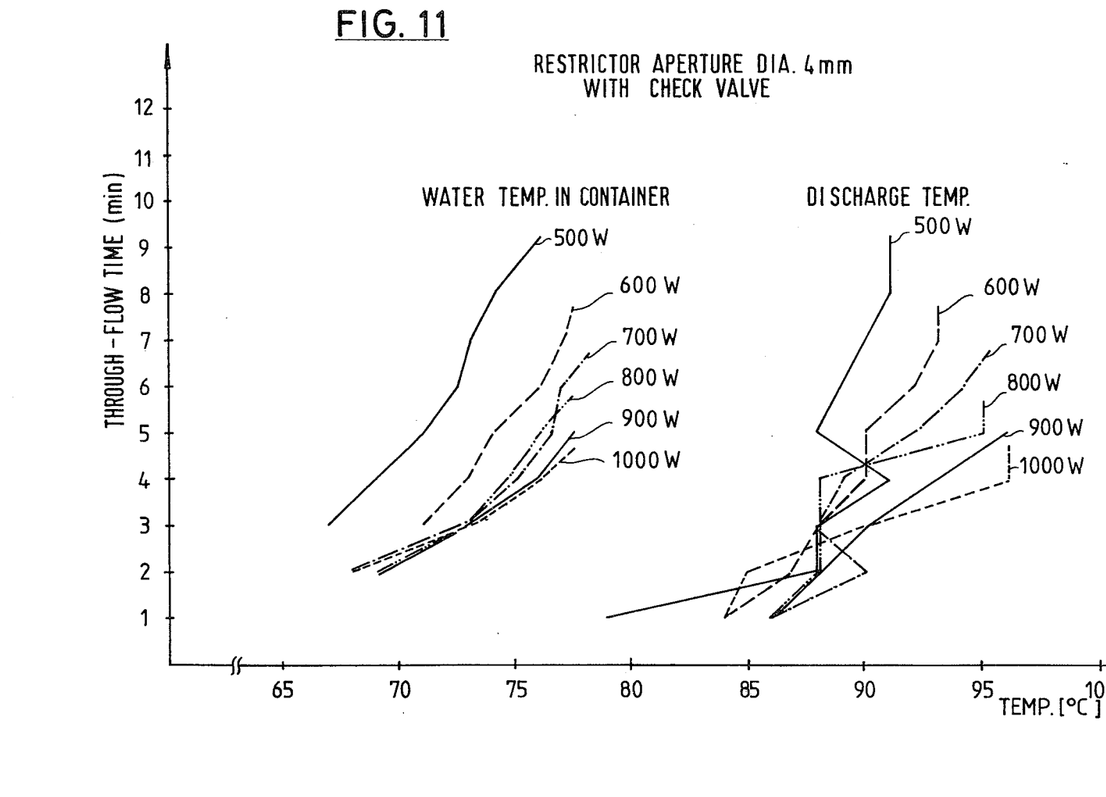
FIGS. 11 and 12 show graphs with a choke or restriction diameter of 4 mm and 5 mm respectively, although in this case a check valve would be required.

If, as shown in FIG. 11, the diameter of the choke was increased to 4 mm, a check valve was then required, as the discharge temperature curves show that, apart from when using the high heating outputs of 900 W and 1000 W, the apparatus lapses into a discontinuous mode, with severe fluctuations in the water discharge temperature.

Figure 12:
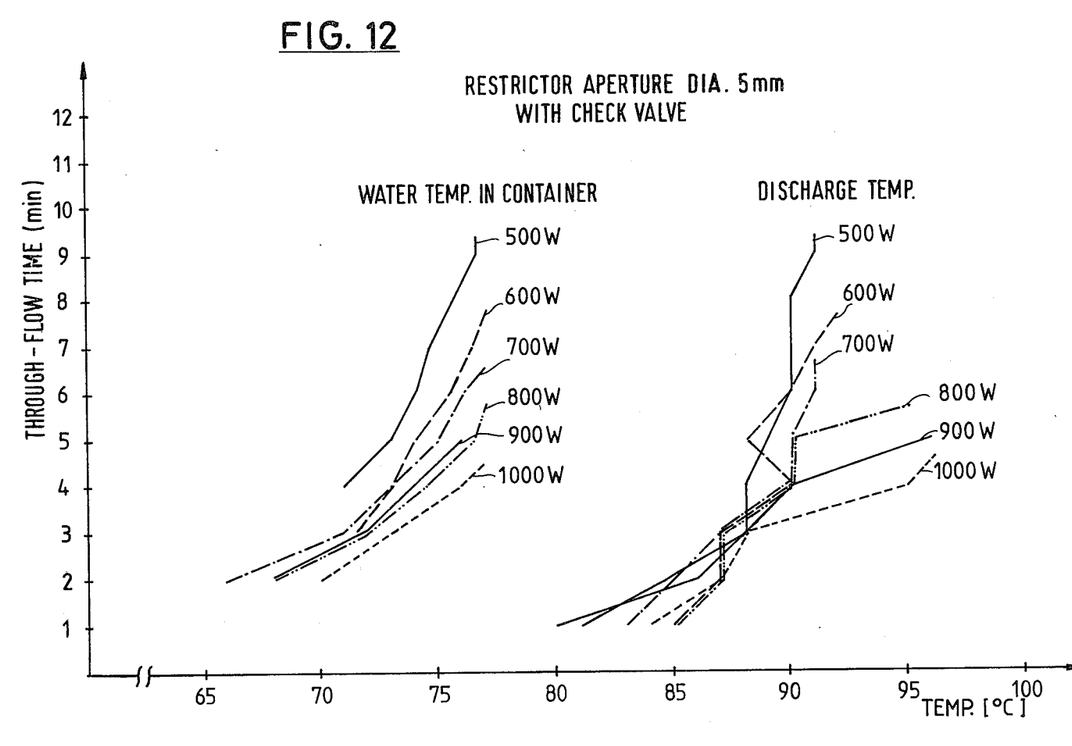

A similar situation arises when the diameter of the choke aperture was increased in size to 5 mm, as shown in FIG. 12.

Figure 13:
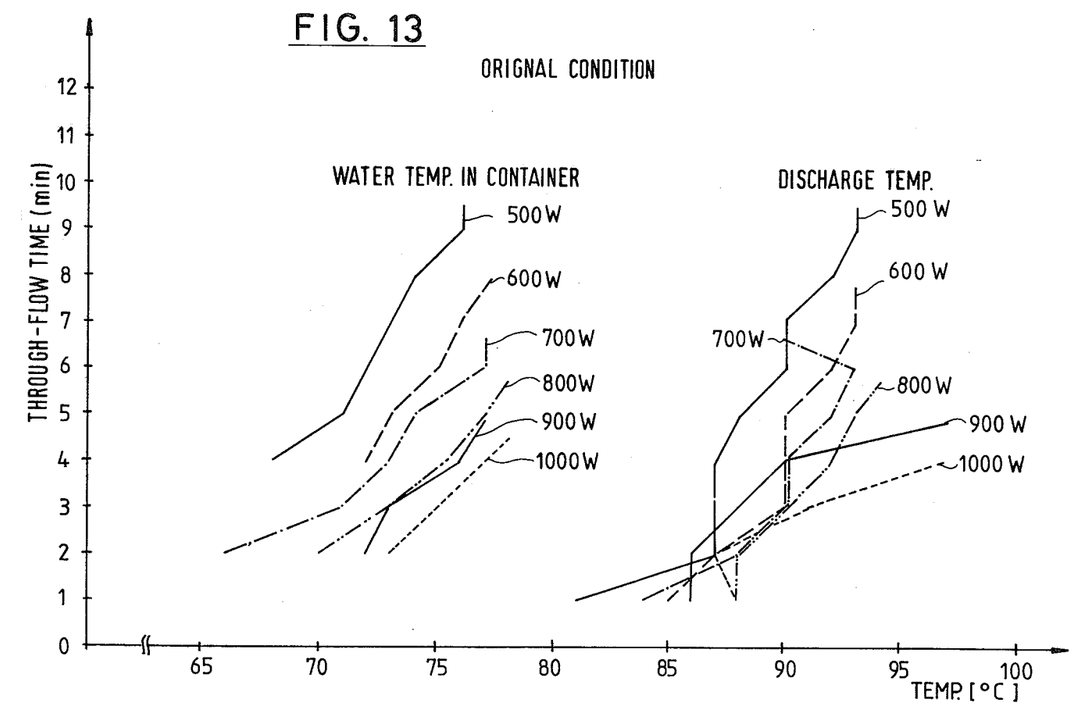
FIG. 13 shows a comparative graph in respect of a conventional apparatus of the general kind discussed above.

The comparative diagram shown in FIG. 13, in respect of which the same apparatus was operated without the choke or throttle means and with a check valve, shows the considerable improvements which were achieved with the preferred choke aperture diameters of from 2.0 to 3.0 mm.

It should be mentioned that the heating output in coffee-making machines is generally designed to be at a value of from 600 to 700 W. The extremely high heating output of 1000 W and the extremely low heating output of 500 W were shown in the respective graphs only to demonstrate the performance of the apparatus, in limit cases of operation.

Larger choke aperture sizes can be used, if two or more restrictor or choke members are disposed in succession and at a spacing from each other. Equally, it will be appreciated that the choke or restrictor apertures may be of other sizes if they are for example of a slot-like or star-like configuration, instead of the round apertures shown in the illustrated embodiments. If, when using a plurality of restrictor apertures or chokes, the apertures are not aligned with each other, the through-flow of water can be caused to assume given characteristics in respect of its movement, for example a rotational movement or a suitable eddy or vortex movement. Theoretically, the restrictor or choke means could also be arranged at the discharge end of the heated water through-flow pipe although this is not to be recommended, because of the danger of clogging by calcification.

If the water through-flow passage or pipe comprises a plurality of lines or branches, the lines or branches may be disposed in a series-connected or parallel-connected arrangement. Such constructions may be selectively used for example if, when using an extruded member or a pressure-cast member, for example for the plate 13, there are for example two grooves or channels to the water through-flow passage, besides the groove or channel to accommodate the electrical heater member.

The optimum size of the restrictor or choke also depends on the minimum and maximum difference in height between the level of water in the supply container 8 and the discharge opening of the riser pipe 7.

As in the embodiment of FIG. 6, the opening of the restrictor or choke means may be adjustable or controllable. If this is effected for example by squeezing a resilient or elastic member 16 forming part of the water flow passage, care should be taken to ensure that the above-described characteristics are maintained, that is to say, the flow of cold water should still be introduced into the centre of the column of water in the pipe 2, as far as possible.

The member 16 may be in the form of a tube which is connected to the inlet end of the water through-flow pipe 2, a clamping means 15 being provided for reducing the through-flow opening of the tube, thereby changing the through-flow cross-section. The clamping means 15 may be actuated by means of a toggle switch 17, by way of a lever 19 which is pivoted about pivot point 18. With this arrangement, it is also advantageously possible to provide for selection of aroma or flavour of the beverage, in dependence on the desired manner in which the taste is to be altered in strength.

The size or diameter of the choke or restrictor aperture may also be theoretically reduced below the value of 2 mm shown in FIG. 7, particularly when using lower levels of heating output. With a heater output of 650 W, this then gives the advantage that a water discharge temperature of 95° C. is reached after the first minute. The maximum value of 98° C. is reached after the fourth minute, this being a temperature which could be achieved, when the diameter of the restrictor aperture or choke was 2 mm, only when the heater output was over 800 W. In that case however, more than 10 minutes was required for the whole of the amount of water to pass through the apparatus. It should also be noted that small restrictor opening sizes or diameters of this kind tend to be critical.

Although using an aperture-forming member as shown at 3 is a very economical and simple way of controlling the water flow, it will be appreciated that other forms of restrictor or choke means may also be considered, for example fine-mesh screens, or filter means, for example of plastic fibres, which can also be arranged to be interchangeable.

The overall diameter of the water pipe or passage is not critical, the diameter of the water through-flow pipe in the testing arrangement being 10 mm. However, indentations or inward bulges or reductions in the diameter of the pipe, to more than half the cross-section thereof, have not had an effect from the measuring point of view.

Corresponding tests were carried out with different kinds of constructions of apparatus of this kind. The effect in accordance with the arrangement of the invention was found to be substantially independent of the specific construction of the apparatus, that is to say, independent of the materials, for example copper, copper-nickel alloys or aluminum, used for forming the water through-flow pipe and the tubular heater member, and also independent of the manner in which these components are secured together. Equally, apparatus in which suitable through-flow passages for the water and corresponding passages for inserting the heater member are provided in pressure-cast components, are also suitable for use of the invention therein.

If the choke or throttle means is in the form of an interchangeable or replaceable filter, there is the advantage with this arrangement that solids can be filtered out. Solids can sometimes occur in mains water, for example due to deposits or sediment in the pipe system becoming detached from the pipe and passing into the flow of water through the system. Even incorrect use, for example if cold coffee is poured into the supply container 8 so as to be heated up by passing the coffee through the apparatus, can enjoy certain advantages in this respect, as the filter can be cleaned or replaced as required.

Various modifications may be made in the above-described apparatus without thereby departing from the spirit or scope of the invention, and such modifications are accordingly to be deemed in accordance with the invention.

I claim:

1. In apparatus for making an infusion beverage, comprising means for receiving a fluid supply container, a fluid through-flow conduit adapted to communicate with said supply container to carry fluid therefrom, means having a heating output from 500 to 1,000 watts for heating fluid in said conduit, a pipe adapted to carry heated fluid to an outlet for infusion of the beverage, and means disposed between said supply container and a part of said conduit for regulating the flow of fluid therethrough, the improvement wherein said regulating means is a restrictor means operable to reduce the cross-section of the flow therethrough to a cross sectional area having an effective diameter not larger than 3.0 mm and to increase the through-flow speed whereby the quantity of fluid flowing through the conduit per unit of time is substantially constant over substantially the entire period for which the fluid is flowing through the apparatus and the flow pressure in the restrictor means is higher than a fluid pressure required for driving the fluid out of said pipe.

2. Apparatus as set forth in claim 1 wherein said restrictor means restricts the through-flow cross-section to a cross sectional area having an effective diameter at least equal to 2.0 mm.

3. Apparatus as set forth in claim 1 wherein said restrictor means is disposed at the outlet opening of said supply container to said conduit.

4. Apparatus as set forth in claim 1 wherein said restrictor means is disposed within said heated conduit.

5. Apparatus as set forth in claim 1 wherein said supply container is connected to said conduit by a flow passage means and wherein said restrictor is disposed in said flow passage means.

6. Apparatus as set forth in claim 5 wherein said flow passage is a flexible connecting conduit and further including clamp means adapted to selectively reduce the diameter of said flexible conduit thereby to provide an adjustable said restrictor means.

7. Apparatus as set forth in claim 1 wherein said restrictor means comprises an aperture member in the conduit portion carrying the fluid flow.

8. Apparatus as set forth in claim 7 wherein the aperture in said aperture member is round.

9. Apparatus as set forth in claim 7 wherein the aperture in said aperture member is non-round.

10. Apparatus as set forth in claim 1 wherein said conduit extends horizontally in use of the apparatus and the restriction opening of said restrictor means is below the axial centre line of said conduit.

11. Apparatus for making an infusion drink, comprising:
a water supply container having an outlet;
a conduit having a first end and a second end, said first end being in communication with said outlet for carrying water therefrom;
a riser pipe having a first end in communication with said second end of said conduit and a second end forming a hot fluid discharge opening, for infusion of a drink by said hot fluid;
means having a heating output from 500 to 1,000 watts for heating water in said conduit;
restrictor means disposed at at least one position between said outlet of said supply container and said riser pipe and operable to reduce the cross-section of the flow between said outlet and said riser pipe to a cross sectional area having an effective diameter not larger than 3.0 mm and to increase the speed of said flow thereby to maintain a substantially constant flow rate through the conduit and to produce a pressure at the resistrictor means to prevent a back flow from said second end of said conduit towards said supply container outlet.

12. Apparatus as set forth in claim 1 or claim 11 wherein said restrictor means comprises a member providing a throttle opening in said conduit.

13. Apparatus as set forth in claim 12 wherein said opening is round.

14. Apparatus as set forth in claim 12 wherein said opening is star-shaped.

15. Apparatus as set forth in claim 12 wherein said opening is a slot.

16. Apparatus as set forth in claim 11 wherein said restrictor means comprises an adjustable means for reducing the flow cross-section in a portion of said conduit.

17. Apparatus as set forth in claim 16 wherein said conduit portion is a flexible pipe and said adjustable means is a pipe-clamping means.

18. Apparatus as set forth in claim 11 wherein the reduction in the flow cross-section which is produced by said restrictor means in said conduit is in the region of 1 to 2% of the cross-sectional area of said conduit.

19. Apparatus as set forth in claim 11 wherein the restriction opening provided by said restrictor means has a cross sectional area with an effective diameter at least equal to 2.0 mm.

20. Apparatus as set forth in claim 1, wherein said restrictor means has a uniform cross sectional area and is positioned to introduce cold fluid into the axial center of previously heated fluid in the fluid through-flow conduit.

21. Apparatus as set forth in claim 20, wherein said restrictor means has a uniform cross sectional area and is positioned to introduce cold fluid into the axial center of previously heated fluid in the conduit.

22. Apparatus as set forth in claim 20 or 21, wherein said restrictor means is positioned so that fluid flows in a horizontal direction through said restrictior means.

* * * * *